United States Patent [19]

Onoda et al.

[11] Patent Number: 5,133,651
[45] Date of Patent: Jul. 28, 1992

[54] SCROLL COMPRESSOR WITH A FLUID THRUST BEARING

[75] Inventors: Tadayuki Onoda, Toyonaka; Tatuhisa Taguchi, Katano, both of Japan

[73] Assignee: Matsushita Electric Industrial Co, Ltd., Osaka, Japan

[21] Appl. No.: 615,009

[22] Filed: Nov. 19, 1990

[30] Foreign Application Priority Data

Nov. 17, 1989 [JP] Japan ................ 1-300436

[51] Int. Cl.$^5$ ............... F04C 18/04; F04C 29/02; F16C 32/06
[52] U.S. Cl. ................. 418/55.6; 418/76; 418/77; 418/79; 384/123
[58] Field of Search .......... 418/55.6, 76, 77, 79, 418/81, 94; 384/112, 121, 123

[56] References Cited

U.S. PATENT DOCUMENTS

| | | | |
|---|---|---|---|
| 2,570,682 | 10/1951 | Imbert | 384/123 |
| 3,891,282 | 6/1975 | Tuffias | 384/123 |
| 4,699,525 | 10/1987 | Mizobuchi et al. | 384/123 |
| 4,702,683 | 10/1987 | Inaba et al. | 418/55.6 |
| 4,772,188 | 9/1988 | Kimura et al. | 418/55.6 |

FOREIGN PATENT DOCUMENTS 1-130081  5/1989  Japan .

*Primary Examiner*—John J. Vrablik
*Attorney, Agent, or Firm*—Wenderoth, Lind & Ponack

[57] ABSTRACT

A thrust bearing of a scroll compressor to be used as a fluid compressor for a refrigeration or air conditioning unit, is designed to resist the moment exerted on the orbiting scroll member, and tending to tilt the orbiting scroll member, so as to prevent the clearance between a thrust surface and a surface of the orbiting scroll member slidingly supported thereon from being reduced or the surfaces from making local contact. The thrust bearing uses wedge shaped grooves having tip end portions in which fluid is compressed by the orbiting motion of the scroll member to generate dynamic pressure at one side of the compressor. This dynamic pressure maintains the clearance between the thrust surface and the surface of the orbiting scroll member thereby stabilizing the movement of the orbiting scroll member.

6 Claims, 5 Drawing Sheets

SCROLL COMPRESSOR WITH A FLUID THRUST BEARING

BACKGROUND OF THE INVENTION

The present invention generally relates to the thrust bearing structure of a scroll compressor to be used as a fluid compressor for a refrigeration or air conditioning unit, etc.

The operating principle and the basic structure of a scroll compressor will be described with reference to FIG. 9 and FIG. 10.

When the orbiting scroll member 3 is caused to undergo orbiting motion (arrow A) and the rotation thereof is prevented, with spirally shaped wraps 1a, 1b of substantially the same shape provided on plates 2a, 2b of the orbiting scroll members and fixed scroll member 4 being mutually engaged, the volume of fluid sucked in from the suction opening 5 is gradually reduced in a reduction chamber 6 (6a, 6b) delimited by the orbiting scroll member 3 and the fixed scroll member 4 so as to increase its pressure before discharging it through the discharge opening 7.

A rotation preventing mechanism 9 is provided between the orbiting scroll 3 and a frame 8. A crank shaft 11, rotatably supported on a bearing 10 which is disposed at the center of the frame 8, is engaged at one end thereof with a rotary shaft 12 of the orbiting scroll member 3 and is rotatably driven by a driving source 13 such as motor or the like. The fluid sucked in from the suction opening 5 is compressed within the compression chamber 6, is discharged through the discharge opening 7 and flows into the discharge pipe 14. These elements are accommodated in a closed casing. Lubricating oil 16 stored in the bottom portion of the casing 15 is fed into the upper portion of the casing through through-hole 18 by a pump mechanism 17 at the lower end of the crank shaft 11.

Also, a sliding surface 19 is formed on the frame 8 opposite to the rear surface of the orbiting scroll member 3 so as to prevent both the scroll members 3, 4 from being separated by the pressure in the compression chamber 6.

In such a scroll compressor, the fluid pressure generated in the compression chamber 6 by the orbiting motion A of the scroll member 3, as shown in FIG. 11, acts at point G half-way up the wraps 2a, 2b and generates a compression force FG. The force FS for orbiting the orbiting scroll member 3 acts on the side of orbiting scroll member 3 opposite the wraps at point S to create a reaction force on the crank shaft 11 which is in system contact. Therefore, the action point G of the fluid pressure and the action point S of the orbiting force are spaced in the axial direction of the compressor, and the forces FG and FS act in directly opposite directions, whereby a moment M is generated. The moment M acts in a direction tending to tilt the orbiting scroll member 3, with a result that a strong thrust force FJ is locally applied to the sliding surface 19 of the frame 8. The deviation of such thrust force FJ causes deleterious effects such as an abnormal abrasion of the sliding face, loss due to increases in sliding friction, an unstable axial thrust force, unstable orbiting motion of the orbiting scroll member and so on.

SUMMARY OF THE INVENTION

Accordingly, the present invention has been developed to substantially eliminate the above-discussed drawbacks inherent in the prior art and has as its essential object to provide an improved scroll compressor.

Another important object of the present invention is to provide an improved scroll compressor, wherein the moment exerted on the orbiting scroll member, tending to tilt the orbiting scroll member, is resisted by fluid pressure so as to prevent the clearance between the thrust surface and the orbiting scroll member from being reduced or from coming into local contact, whereby a stable orbiting motion is obtained.

In accomplishing these and other objects, according to the first embodiment of the present invention, a ring-shaped oil feeding groove, and a plurality of wedge-shaped grooves which are open to the oil feeding groove and taper in a radial direction towards the center of the compressor, are formed in the thrust surface which supports the thrust force of the orbiting scroll member.

In the second invention of the present invention, a plurality of wedge-shaped grooves are open to an oil feeding path formed in the inner peripheral portion of the thrust surface, and taper in a radial direction in the surface of the orbiting scroll member, opposite the scroll wrap, towards the external periphery of the orbiting scroll member.

In the operation of the first embodiment of the present invention, the oil is fed into the ring-shaped oil feeding groove from the oil reservoir, and the lubricating oil follows the orbiting motion of the orbiting scroll member by adhering to the orbiting scroll member or owing to the viscosity of the oil. Because the wedge-shaped grooves taper in a direction thereof normal to the oil feeding groove and towards the center of the compressor, the oil is compressed in respective ones of the above-described wedge-shaped grooves so as to generate dynamic pressure. On the side of the compressor opposite to the side where the dynamic pressure is generated, the grooves diverge in the direction of movement of the orbiting scroll member, so that dynamic pressure is not generated.

The dynamic pressure generated by the wedge effect is exhibited in the region of an approximately semicircular portion of the thrust surface, but is not generated at the remaining portion of the sliding surfaces. Thus, the oil film pressure is larger locally, and the thrust force produced by the moment acting on the orbiting scroll member is resisted by the local pressure.

In the operation of the second embodiment of the present invention, the wedge-shaped grooves are open to the oil feeding path, and are formed in the rear surface of the orbiting scroll member so as to taper in a radial direction toward the external periphery of the scroll member. When the orbiting scroll member undergoes orbiting motion, the lubricating oil which has been fed to the oil feeding path is compressed in the above-described wedge-shaped grooves so as to generate dynamic pressure by a wedging effect. As in the operation of the first embodiment, on the side of the compressor opposite to that at which the dynamic pressure is generated, the fluid flows into the divergent portions of the grooves so that dynamic pressure is not generated. Therefore, the dynamic pressure is generated at only an approximately semicircular region of the rear surface of the orbiting scroll member, but is not generated in the other region, so that the thrust is resisted at one local area.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
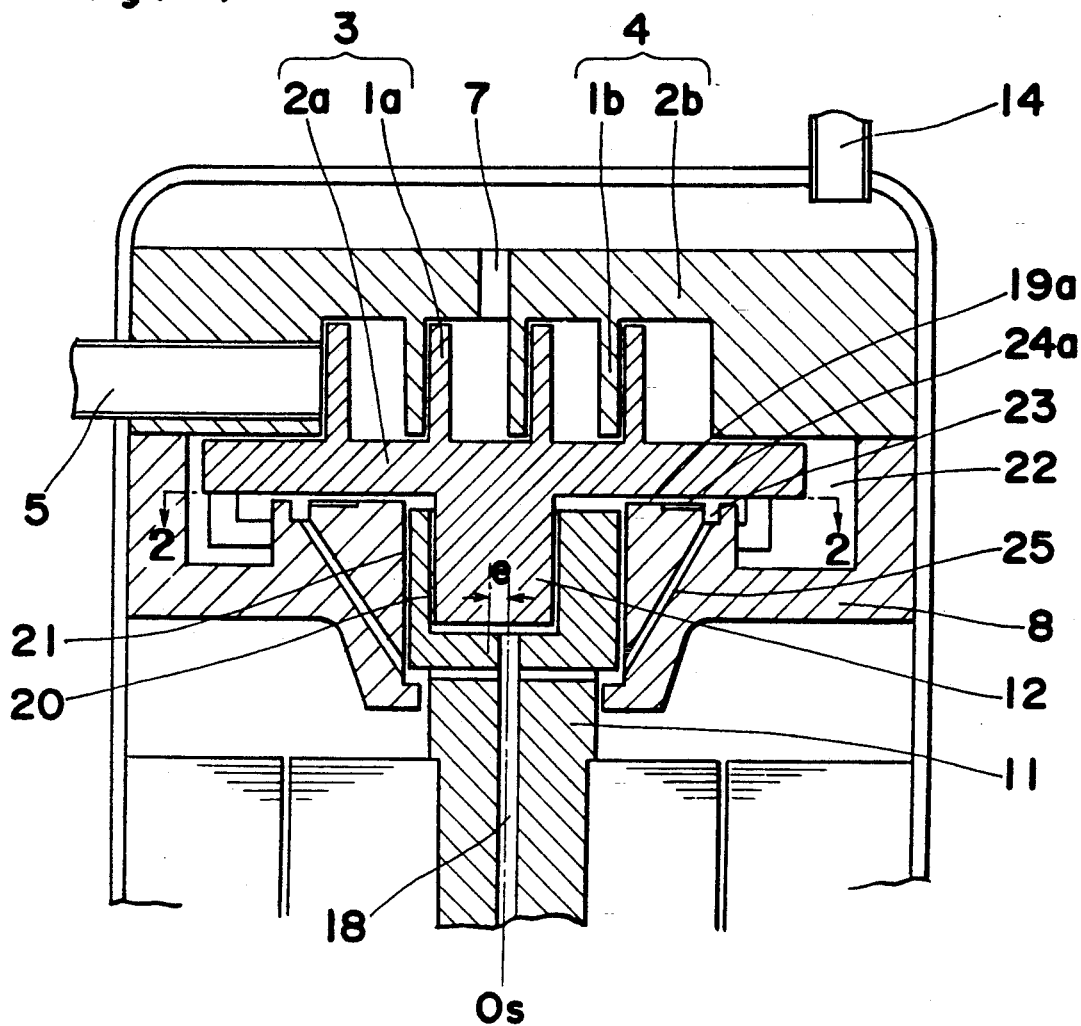
FIG. 1 is a longitudinal sectional view of a portion of a first embodiment of a scroll compressor according to the present invention.

Before the description of the present invention proceeds, it is to be noted that like parts are designated by like reference numerals throughout the accompanying drawings.

Figure 2:
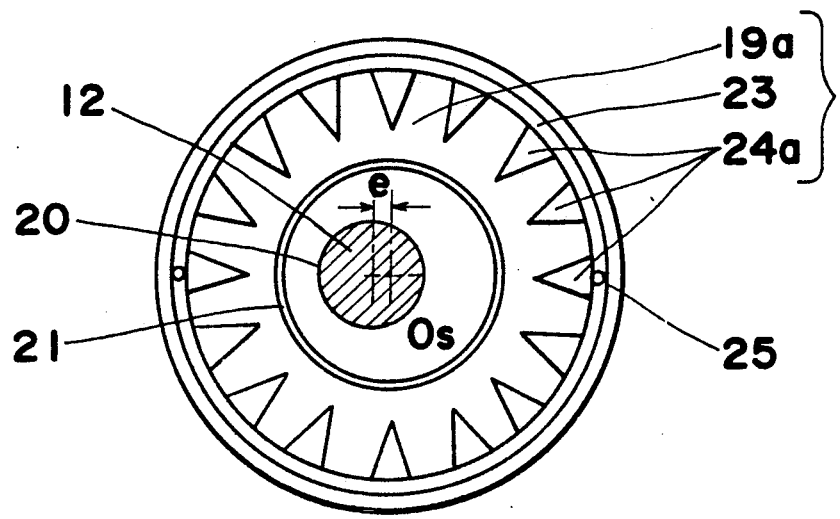
FIG. 2 is a sectional view taken along line 2—2 of FIG. 1.

FIG. 1 and FIG. 2 show thrust bearing structure of a first embodiment of a scroll compressor according to the present invention. An orbiting scroll member 3 is engaged with a fixed scroll member 4 with wraps 1a, 1b facing opposite each other. The rotary shaft 12 which is provided on the surface (hereinafter referred to as rear surface) of a disc-shaped plate 2a of the orbiting scroll member 3, opposite the wraps, is rotatably engaged with an eccentric bearing 20 with an eccentricity e being established between the axis of rotation OS of the crank shaft 11 and the central longitudinal axis of shaft 20. The crank shaft 11 is supported for free rotation on a large bearing 21 provided at the center of the frame 8. The end portion of the frame 8 defines a space 22 wherein the orbiting scroll member 3 is free to orbit. A sliding surface 19a for slidably supporting the orbiting scroll member 3 is provided around the lower bearing 21.

A ring-shaped oil feeding groove 23 extends in the sliding surface 19a near the external periphery of the sliding surface. Ends of wedge-shaped grooves 24a are open to the oil feeding groove 23, the grooves tapering, respectively, towards the center axis of rotation OS. Oil is fed into the oil feeding groove 23 at one or more locations through a through-hole 18 and an oil feeding hole 25, by pumping the lubricating oil from the oil reservoir into the crank shaft 11 with a pump or the like.

Figure 3:
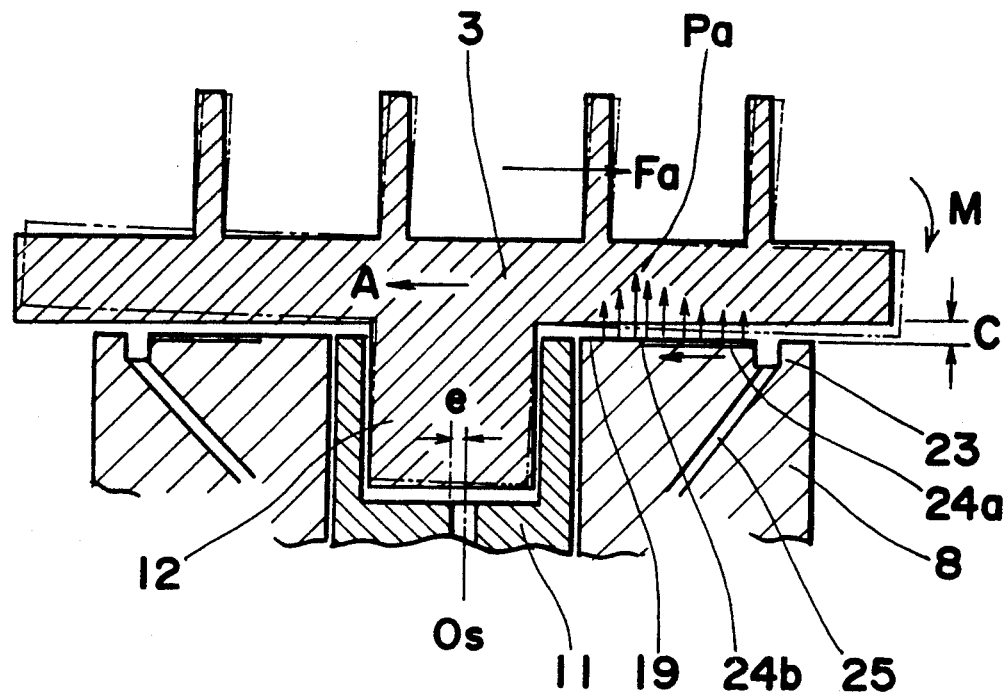
FIG. 3 is a longitudinal sectional view of a thrust receiving portion of the compressor shown in FIG. 1.

The operation of the above scroll compressor will be described with reference to FIG. 3 and FIG. 4. In FIG. 3, the orbiting scroll member 3 is subject to being tilted by a working moment M so as to undergo an orbiting motion in an inclined plane as shown by the chain line of the drawing. The gap C between the rear surface of the orbiting scroll member 3 and the sliding surface 19a of the frame 8 on the upstream side of the scroll member in the orbiting direction A is reduced or the surfaces may come into contact with each other.

The oil supplied from the oil source into the ring-shaped oil feeding groove 23 provided near the external periphery of the sliding surface 19a adheres to or follows the orbiting scroll member 3 so as to flow into the tapered tip end portion 24b of the wedge shaped groove 24a whereby dynamic pressure is produced in the tip end portion 24b. On the downstream side of the orbiting scroll member 3 in the orbiting direction A, the space C increases to allow the oil to leak from between the surfaces. Also, the oil adhered to or following the orbiting scroll member 3 flows into the divergent portion of the wedge-shaped grooves 24a at the downstream side, so that the dynamic pressure is not produced thereat.

Figure 4:
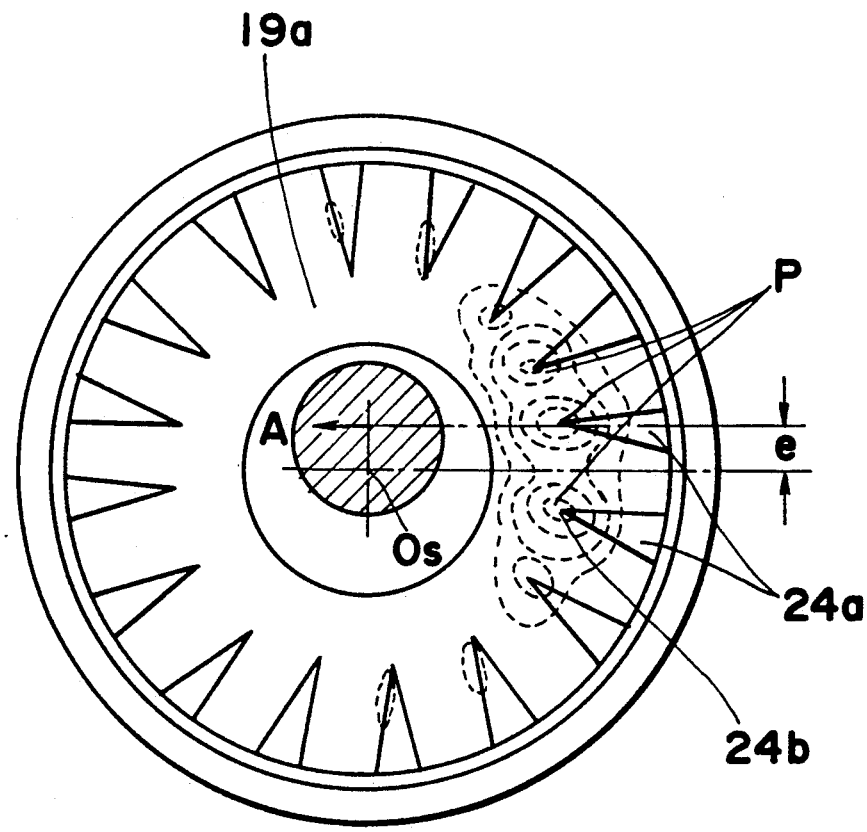
FIG. 4 is a pressure distribution diagram of the sliding face of the thrust receiving portion shown in FIG. 2.

One example of the dynamic pressure distribution at the sliding surface 19a at this time is shown in FIG. 4 (portions P represent areas of higher pressure).

According to the first embodiment of the present invention, the ring-shaped oil feeding groove 23 and plurality of wedge-shaped grooves 24a, which open to the oil feeding groove 23 and taper towards the central axis, are spaced radially apart opposite to the orbiting scroll member 3 in the sliding surface 19a. The tilting force produced by the moment M on the orbiting scroll member 3 is resisted in a direction Pa along which the dynamic pressure generated in the wedge-shaped grooves 24a acts so as to prevent the reduction of the clearance C or contact between the rear surface of the orbiting scroll member 3 and the sliding surface 19a of the frame 8. Thus, the orbiting scroll member 3 is stabilized, and the sliding loss is reduced, and so on.

In the first embodiment of the invention, the dynamic pressure is largest in that wedge-shaped groove 24a located in the range of eccentricity e defined with respect to the axis of rotation OS of the crank shaft 11 (FIG. 4).

Figure 5:
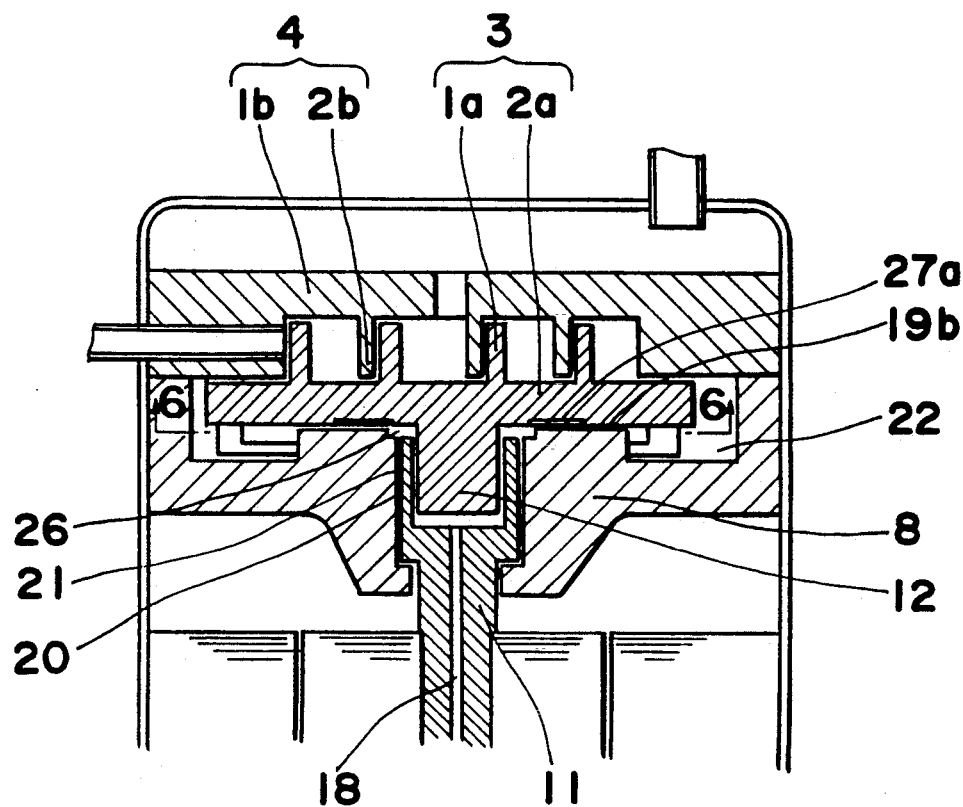
FIG. 5 is a longitudinal sectional view of a portion of a second embodiment of a scroll compressor according to the present invention.
Figure 6:
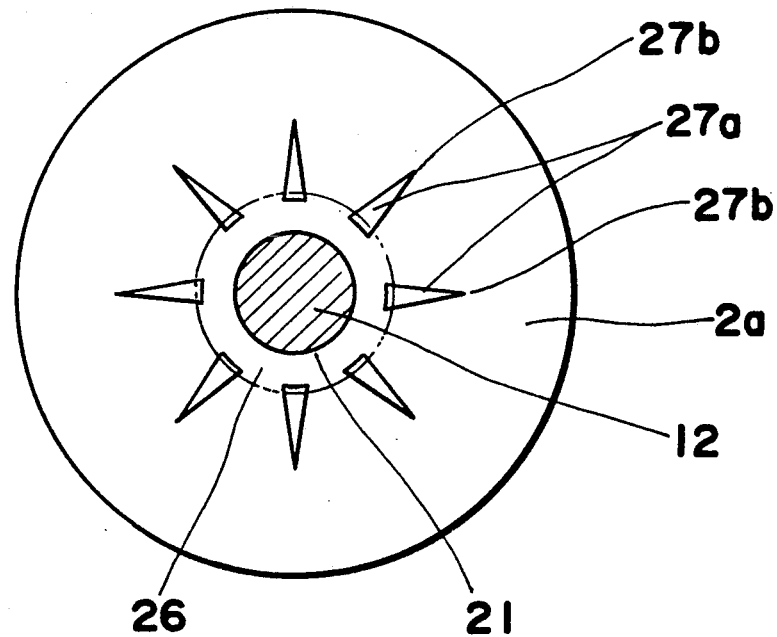
FIG. 6 is a sectional view taken along line 6—6 of FIG. 5.

FIG. 5 and FIG. 6 are a sectional view and a plan view of a second embodiment of the thrust bearing structure of the scroll compressor according to the present invention. The second embodiment has the same basic structure as the first embodiment. The orbiting scroll member 3 confronts and is engaged with the fixed scroll 4. The rotary shaft 12 provided on the rear surface of the end plate 2a of the orbiting scroll member 3 is supported for free rotation within the eccentric bearing 20 of the crank shaft 11. The crank shaft 11 is rotatably supported on the large bearing 21 of the center of the frame 8. The end portion of the frame 8 defines a space 22 wherein the orbiting scroll member 3 may orbit, and a sliding surface 19b for slidingly supporting the orbiting scroll member 3 is provided at the periphery of the large bearing 21.

A ring-shaped oil feeding path 26 is provided around the rotary shaft 12. Wedge-shaped grooves 27a are provided in the rear surface of the orbiting scroll member 3 and open into the oil feeding path 26. The wedge-shaped grooves 27a taper in a direction towards the external periphery of the end plate 2a. The oil is fed from the oil reservoir into the oil feeding path 26 by a centrifugal pump or the like through the through-hole 18 within the crank shaft 11 or through the clearance between the frame 8 and bearing 20.

Figure 7:
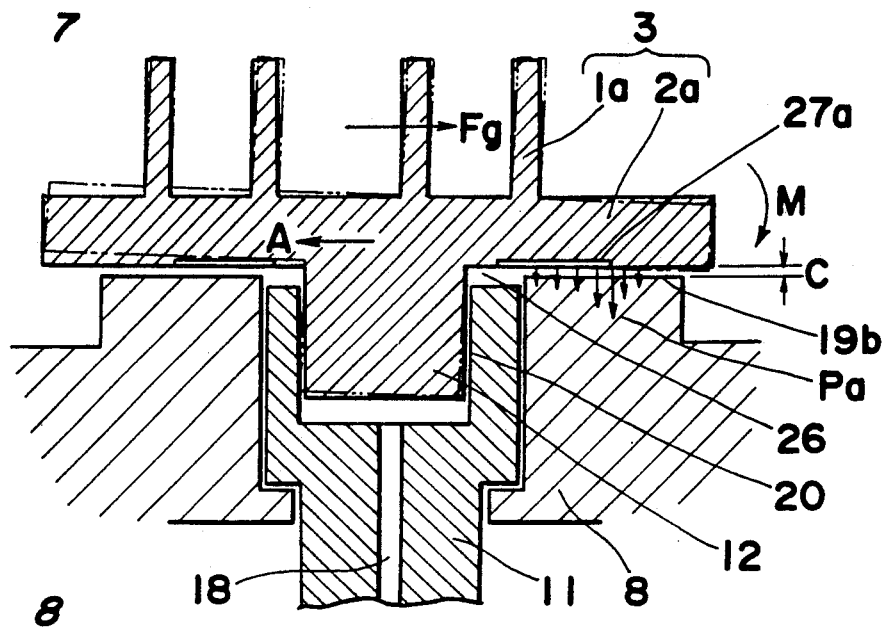
FIG. 7 is a longitudinal sectional view of a thrust receiving portion of the compressor shown in FIG. 5.

The operation of the second embodiment will be described hereinafter with reference to FIG. 7 and FIG. 8. Referring to FIG. 7, the orbiting scroll member 3 is subjected to a tilting force produced by the moment M owing to the compression force FG as described in the first embodiment. The gap C between the rear surface of the orbiting scroll member 3 and the sliding surface 19b of the frame 8 therefore tends to become locally reduced and may place the orbiting scroll member 3 and frame 8 in contact.

The oil is fed from the oil source into the oil feeding path 26 located at the peripheral portion of the rotary shaft 12 so as to flow into the clearance C between the rear surface of the orbiting scroll member 3 and the sliding surface 19b of the frame 8. The oil is thus forced toward the tip end portions 27b of the upstream wedge-shaped grooves 27a by the orbiting motion A of the orbiting scroll member 3, thereby generating dynamic pressure in the tip end portions 27b. On the downstream side of the scroll member in the orbiting direction A, the clearance C increases owing to the inclination of the orbiting scroll member 3 which allows for oil leakage, whereby oil flows in the direction of divergence of respective ones of the wedge-shaped grooves 27a such that dynamic pressure is not produced thereat.

Figure 8:
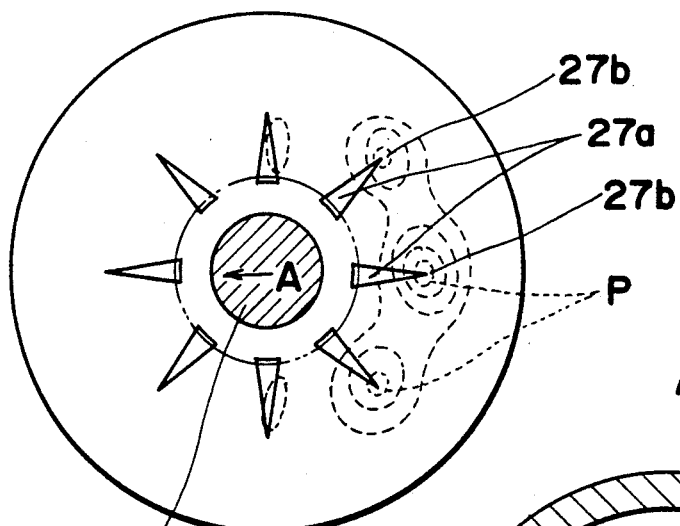
FIG. 8 is a pressure distribution diagram of the rear surface of the orbiting scroll member shown in FIG. 6.
Figure 9:
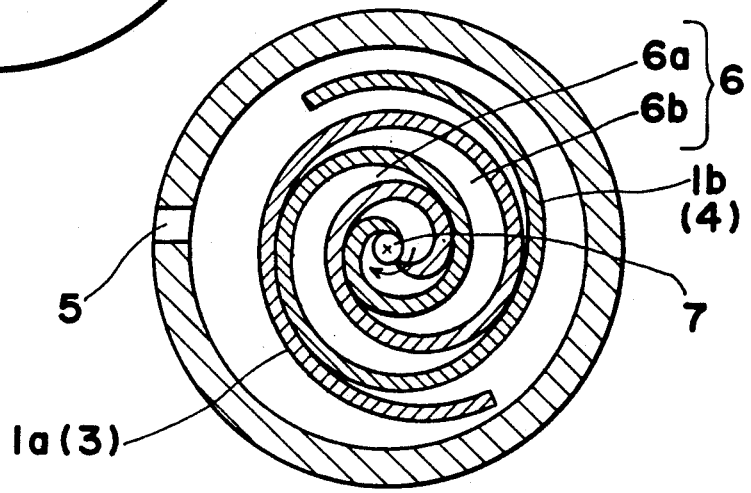
FIG. 9 is a sectional view of a compression portion of a conventional scroll compressor.
Figure 10:
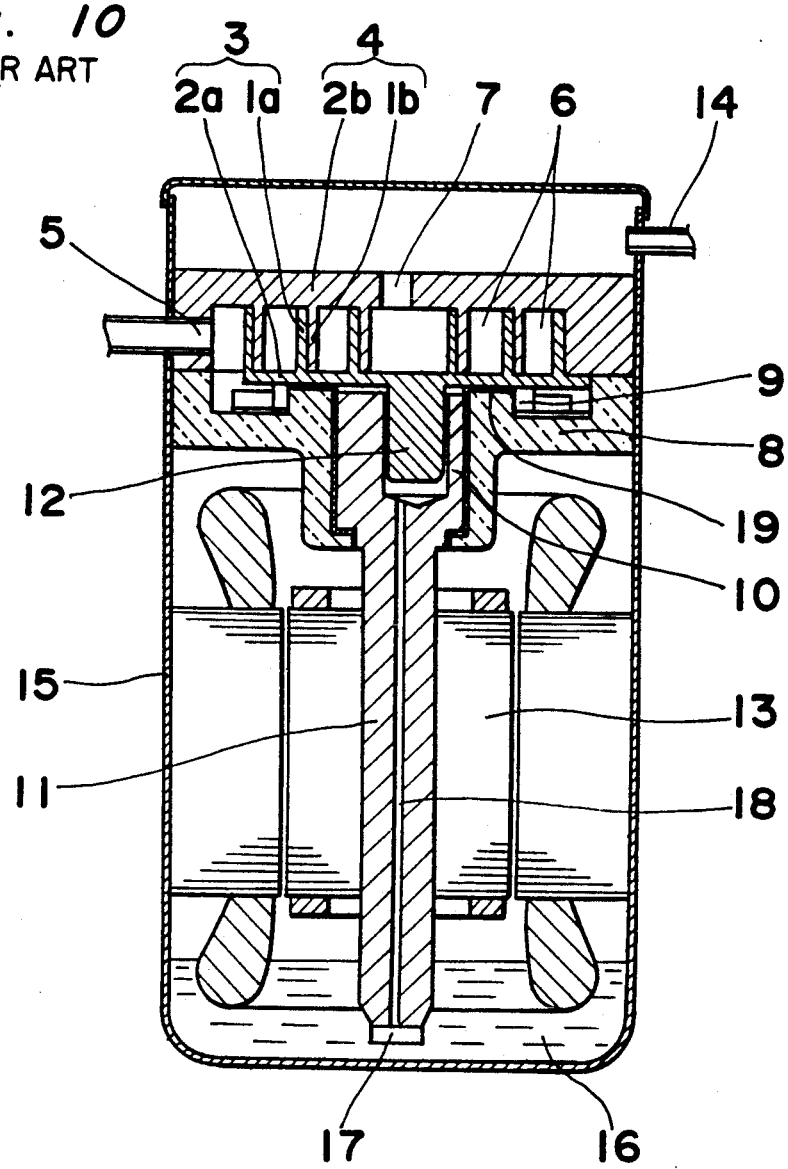
FIG. 10 is a longitudinal sectional view of the conventional scroll compressor.
Figure 11:
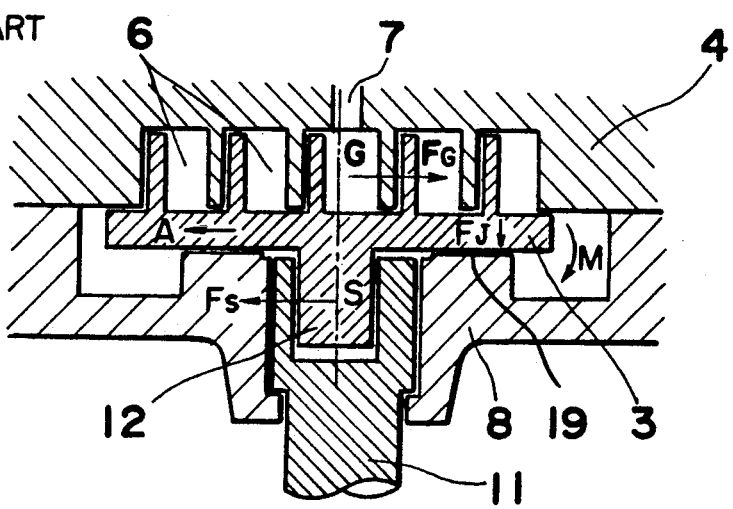
FIG. 11 is a longitudinal sectional view of a portion of the conventional scroll compressor shown in FIG. 10.

One example of the dynamic pressure distribution at the rear surface of the orbiting scroll member 3 at this time is shown in FIG. 8 (portions P indicate the areas of high pressure).

According to the second embodiment of the present invention as described hereinabove, a plurality of wedge-shaped grooves 27a which are open to the oil feeding path 26, taper in a radially outward direction and are spaced radially apart in the rear surface of the orbiting scroll member 3. The tilting force produced by the moment M on the orbiting scroll member 3 is resisted in a direction Pa along which the dynamic pressure generated in the grooves 27a acts so as to prevent the reduction of the clearance C or contact between the rear surface of the orbiting scroll member 3 and the sliding surface 19b of the frame 8. Thus, the orbiting scroll member 3 is stabilized, the sliding loss is reduced, and so on.

As is clear from the foregoing description, according to the first embodiment of the present invention, the ring-shaped oil feeding groove and a plurality of wedge-shaped grooves which are open to the oil feeding groove, and taper towards the central axis of the compressor, are spaced radially apart in the sliding surface opposite the orbiting scroll member. The tilting force produced by the moment M on the orbiting scroll member is resisted by the dynamic pressure produced in the wedge-shaped grooves to prevent the reduction in the clearance C or contact between the rear surface of the orbiting scroll member and the sliding surface of the frame. Thus, the orbiting scroll member is stabilized, the sliding loss is reduced, and so on.

According to the second embodiment of the present invention, a plurality of wedge-shaped grooves, which are open to the oil feeding path and taper in a radially outward direction, are spaced radially apart in the rear surface of the orbiting scroll member. Thus, the orbiting scroll member is stabilized, the sliding loss is reduced, and so on as in the first invention.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. A scroll compressor comprising:

a fixed scroll member having a spiral-shaped wrap;

an orbiting scroll member having an end plate defining a sliding surface at one side thereof, and a spiral-shaped wrap extending from said end plate at a side thereof opposite that on which said sliding surface is defined, said spiral-shaped wraps being in mutual engagement so as to define therebetween a pressure chamber in which compression of working fluid of the compressor takes place;

a frame defining a thrust surface at which said orbiting scroll member is supported, the sliding surface of said orbiting scroll member being in sliding engagement with said thrust surface;

orbiting drive means operatively engaging said orbiting scroll member for orbiting said orbiting scroll member relative to said fixed scroll member with a force acting on said orbiting scroll member in a direction opposite to the direction in which pressure in said pressure chamber acts on said orbiting scroll member and at a location spaced axially in the compressor from a location at which the pressure in said pressure chamber effects a force on the orbiting scroll member, whereby said forces exert a moment on said orbiting scroll member tending to tilt one side of said orbiting scroll member toward said thrust surface;

rotation preventing means operatively connected to said orbiting scroll member for preventing said orbiting scroll member from rotating while orbiting relative to said fixed scroll member;

said thrust surface having a ring-shaped oil feeding groove defined therein communicating with a source of lubricating fluid; and one of said thrust surface and said sliding surface having a plurality of wedge-shaped grooves therein, each of said wedge-shaped grooves having a wide end towards which surfaces defining sides of the wedge-shaped groove diverge and a narrow tip end toward which the surfaces defining the sides of the wedge-shaped groove converge, said wedge-shaped grooves spaced about said ring-shaped oil feeding groove around the central longitudinal axis of the compressor, said wedge-shaped grooves having the wide ends thereof open and located adjacent to said ring-shaped oil feeding groove and extending radially therefrom away from said ring-shaped oil feeding groove such that each of said wedge-shaped grooves tapers from the wide end thereof in a direction away from said ring-shaped oil feeding groove toward the narrow tip end thereof, the disposition of said wedge-shaped grooves relative to said ring-shaped oil feeding groove and the direction in which said orbiting drive means orbits said orbiting scroll member being such that when said orbiting scroll member is orbiting, said orbiting scroll member forces fluid fed to respective ones of the wedge-shaped grooves located at said one side of said orbiting scroll member from the wide ends of said respective wedge-shaped grooves toward the narrow tip ends thereof thereby causing the fluid to generate pressure at said one side of the orbiting scroll member to counteract the moment acting on said orbiting scroll member, whereby local contact between said sliding surface and said thrust surface is prevented.

2. A scroll compressor as claimed in claim 1, wherein said orbiting scroll member has a rotary shaft extending from said end plate at said one side thereof, and said orbiting drive means includes a crank shaft, and an eccentric bearing integral with said crank shaft and engaging said rotary shaft, said eccentric bearing offsetting the central axis of said rotary shaft from that of said crank shaft.

3. A scroll compressor as claimed in claim 1, wherein said thrust surface has the wedge-shaped grooves therein, and said wedge-shaped grooves extend radially inwardly relative to said ring-shaped oil feeding groove such that said wedge-shaped grooves taper toward the central longitudinal axis of the compressor.

4. A scroll compressor as claimed in claim 3, wherein said orbiting scroll member has a rotary shaft extending from said end plate at said one side thereof, and said orbiting drive means includes a crank shaft, and an eccentric bearing integral with said crank shaft and engaging said rotary shaft, said eccentric bearing offsetting the central axis of said rotary shaft from that of said crank shaft.

5. A scroll compressor as claimed in claim 1, wherein said sliding surface has the wedge-shaped grooves defined therein, and said wedge-shaped grooves extend radially outwardly relative to said ring-shaped oil feeding groove such that said wedge-shaped grooves taper toward the external periphery of said orbiting scroll member.

6. A scroll compressor as claimed in claim 5, wherein said orbiting scroll member has a rotary shaft extending from said end plate at said one side thereof, and said orbiting drive means includes a crank shaft, and an eccentric bearing integral with said crank shaft and engaging said rotary shaft, said eccentric bearing offsetting the central axis of said rotary shaft from that of said crank shaft.

* * * * *